United States Patent
Shimada

(10) Patent No.: US 12,328,051 B2
(45) Date of Patent: *Jun. 10, 2025

(54) VIBRATION WAVE DRIVING APPARATUS AND IMAGE PICKUP APPARATUS USING OUTPUT TRANSMISSION MEMBER

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/496,261

(22) Filed: Oct. 27, 2023

(65) Prior Publication Data

US 2024/0055965 A1 Feb. 15, 2024

Related U.S. Application Data

(62) Division of application No. 17/858,644, filed on Jul. 6, 2022, now Pat. No. 11,843,279.

(30) Foreign Application Priority Data

Jul. 29, 2021 (JP) .................................. 2021-124537

(51) Int. Cl.
  *H02K 33/02* (2006.01)
  *H02N 2/00* (2006.01)
  *H02N 2/10* (2006.01)

(52) U.S. Cl.
  CPC ............. *H02K 33/02* (2013.01); *H02N 2/001* (2013.01); *H02N 2/103* (2013.01)

(58) Field of Classification Search
  CPC ...... H02K 33/02; H02N 2/001; H02N 2/0015; H02N 2/0055; H02N 2/04; H02N 2/026
  See application file for complete search history.

(56) References Cited

U.S. PATENT DOCUMENTS 5,982,075 A  11/1999  Hayasaka
6,242,846 B1  6/2001  Ashizawa et al.
(Continued)

FOREIGN PATENT DOCUMENTS

JP  2012-063543 A  3/2012
JP  2020-005374 A  1/2020
JP  2021-087289 A  6/2021

OTHER PUBLICATIONS

Office Action dated Jan. 30, 2025, in Japanese Patent Application No. 2021-124537.

*Primary Examiner* — Emily P Pham
(74) *Attorney, Agent, or Firm* — Venable LLP

(57) ABSTRACT

A vibration wave driving apparatus includes a vibration actuator; and a driven member configured to be driven by the vibration actuator. The vibration actuator includes a vibrator having an electric-mechanical energy conversion element and an elastic member to which the electric-mechanical energy conversion element is fixed; a pressurizing member configured to pressurize the vibrator; a contacting member configured to pressurizing-contact with the vibrator by pressurizing the vibrator by the pressurizing member and move relative to the vibrator; and an outputting member configured to output a driving force to the driven member, the driving force generated by the movement of the contacting member relative to the vibrator. The driven member includes an output transmission member configured to hold the outputting member in a direction of the relative movement with a predetermined spring force.

9 Claims, 10 Drawing Sheets

(56) References Cited

U.S. PATENT DOCUMENTS

| | | |
|---|---|---|
| 8,824,071 B2 | 9/2014 | Ashizawa |
| 11,277,080 B2 | 3/2022 | Osawa |
| 2009/0039806 A1* | 2/2009 | Kudo .................. H02N 2/0075 318/116 |
| 2023/0029612 A1 | 2/2023 | Inoue et al. |

* cited by examiner

VIBRATION WAVE DRIVING APPARATUS AND IMAGE PICKUP APPARATUS USING OUTPUT TRANSMISSION MEMBER

BACKGROUND OF THE INVENTION

Field of the Invention

This disclosure relates to a vibration wave driving apparatus and an image pickup apparatus.

Description of the Related Art

Various configurations of the vibration wave driving apparatus using an electric-mechanical energy conversion element such as a piezoelectric element which converts electric energy into mechanical energy are known. For example, there is known a vibration wave driving apparatus having a contacting member, a vibrator in which two protruding portions are provided on a surface of a flat elastic member and a piezoelectric element is joined to the rear surface of the elastic member, and a pressurizing member for pressurizing-contacting the two protruding portions with the contacting member. Here, the rear surface of the elastic member is a surface on which no protruding portion is formed. The protruding portion will be described later.

In this vibration wave driving apparatus, by applying a predetermined alternating voltage (hereinafter also referred to as "driving voltage") to the electric-mechanical energy conversion element, elliptical or circular motions of the tips of the two protruding portions are generated in a plane including a direction connecting the two protruding portions and the projecting direction of the protruding portions. Thus, the contacting member is subjected to a friction driving force from the two protruding portions (vibrator), so that the vibrator and the contacting member can be relatively moved (hereinafter also referred to as "relative-moving") in the direction connecting the two protruding portions.

Various proposals have been made as a mechanism (output transmission mechanism) for transmitting an output from the vibration wave driving apparatus to the outside. For example, in Japanese Patent Application Laid-Open No. 2012-63543, an output is transmitted to an AF ring by gap-fitting, press-fitting, or screwing a connecting portion to a protruding portion extending from a moving element in a pressurizing direction. On the other hand, in Japanese Patent Application Laid-Open No. 2020-5374, an output is transmitted to the outside by pressing a V-shaped recess portion against a protruding portion extending from a holding member in a pressurizing direction by a force from a torsion spring.

However, in the output transmission mechanism disclosed in Japanese Patent Application Laid-Open No. 2012-63543, in a case where the output transmission mechanism having a configuration with a gap, a positional deviation occurs between the moving element and the AF ring, which is a driven member. Therefore, the stop accuracy is adversely affected by the positional deviation. In addition, in a case where the output transmission mechanism is fastened by press-fitting or screwing, although the stopping accuracy is better, an extra force is applied to the vibration wave driving apparatus or the driven body side due to an error in the parallelism between the driven member and a movement axis of the moving element. It may cause a reduction in the output transmitted to the outside and a deterioration in the durability.

On the other hand, in the technique disclosed in Japanese Patent Application Laid-Open No. 2020-5374, the output is transmitted to the outside by pressing the V-shaped recess portion against the projection on the vibration wave driving apparatus side by the force of the torsion spring, thereby absorbing the error of the parallelism between a driven member and a movement axis of the vibration wave driving apparatus while securing the stop accuracy by eliminating the gap. However, in this configuration, the protrusions and the vibration wave driving apparatus receive a force in the pressurizing direction or in the other direction. As described above, since the vibration wave driving apparatus generates the output by bringing the vibrator into pressurizing-contact with the contacting member, the pressurizing force applied by the V-shaped recess portion must be applied to a location that is not affected by the pressurizing-force applied to the vibrator. Therefore, in the technique disclosed in Japanese Patent Application Laid-Open No. 2020-5374, there is a case in which miniaturization of the apparatus is not possible due to the design constraints.

An aspect of the present disclosure has been made in view of such problems, and it is an object of the aspect of the present disclosure to provide a vibration wave driving apparatus which is small in size and can suppress a decrease in an output transmitted to the outside.

SUMMARY OF THE INVENTION

A vibration wave driving apparatus according to an aspect of the present disclosure comprises a vibration actuator, and a driven member configured to be driven by the vibration actuator, wherein the vibration actuator includes a vibrator having an electric-mechanical energy conversion element and an elastic member to which the electric-mechanical energy conversion element is fixed, a pressurizing member configured to pressurize the vibrator, a contacting member configured to pressurizing-contact with the vibrator by pressurizing the vibrator by the pressurizing member and move relative to the vibrator, and an outputting member configured to output a driving force to the driven member, the driving force generated by the relative-moving of the contact member to the vibrator, and wherein the driven member includes an output transmission member configured to hold the outputting member in a direction of the relative-moving with a predetermined spring force.

Further features of the present invention will become apparent from the following description of exemplary embodiments with reference to the attached drawings.

DESCRIPTION OF THE EMBODIMENTS

Figure 1:
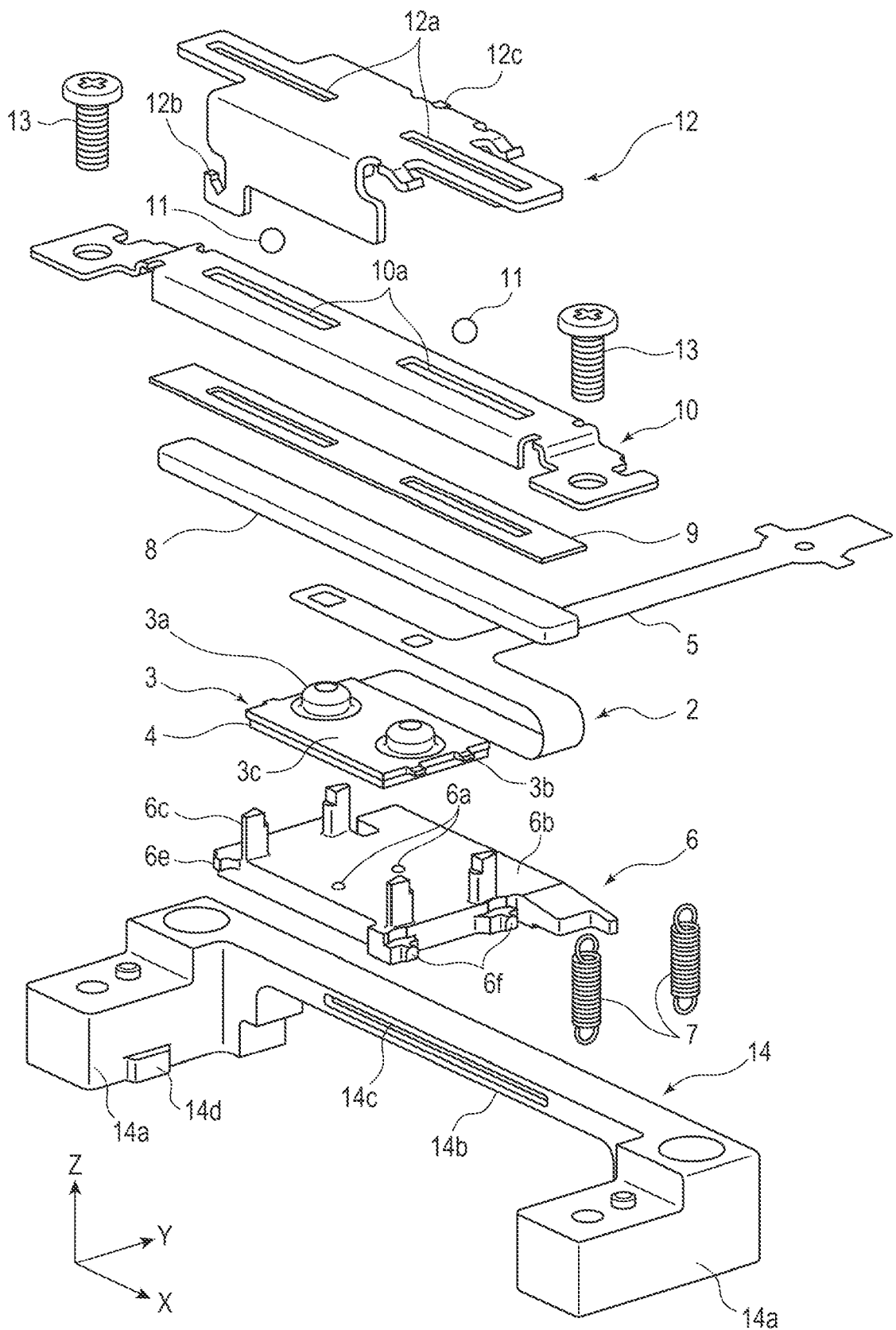
FIG. 1 is an exploded perspective view for illustrating an example of a vibration wave motor according to a first embodiment.

Exemplary embodiments of the present disclosure will now be described in detail in accordance with the accompanying drawings. However, the dimensions, materials, shapes and relative positions of the components described in the following embodiments are not determinate, and can be changed according to a configuration of an apparatus to which the present disclosure is applied or to various conditions. Further, identical or functionally similar elements are denoted by the same reference numerals in different drawings.

First Embodiment

Figure 2A:
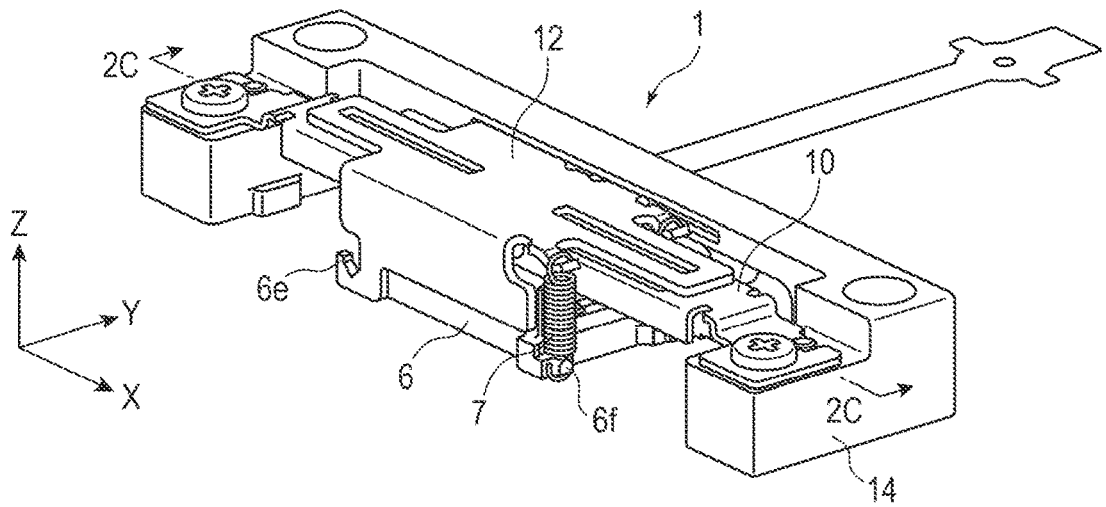
FIG. 2A is a view for illustrating the example of the vibration wave motor according to the first embodiment.
Figure 2B:
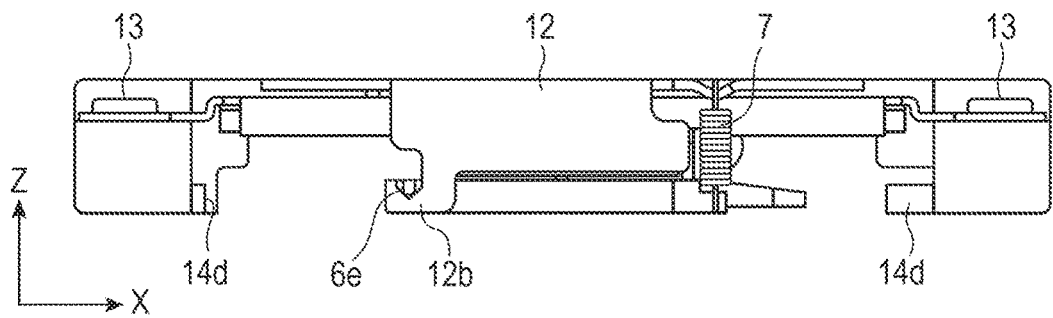
FIG. 2B is a view for illustrating the example of the vibration wave motor according to the first embodiment.
Figure 2C:
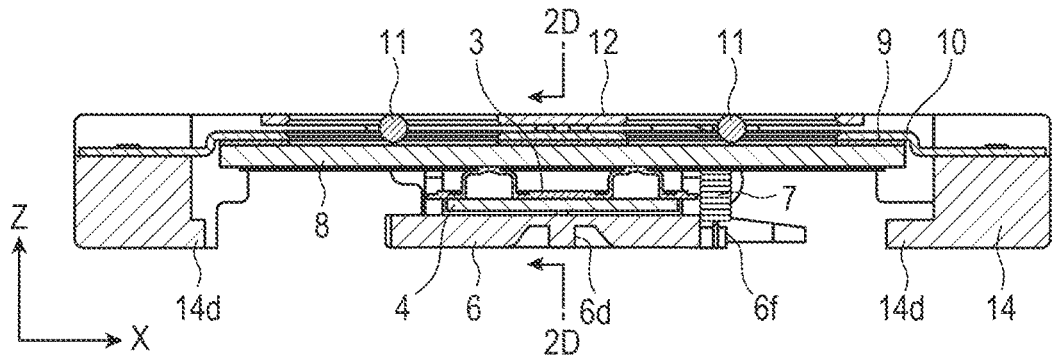
FIG. 2C is a view for illustrating the example of the vibration wave motor according to the first embodiment.
Figure 2D:
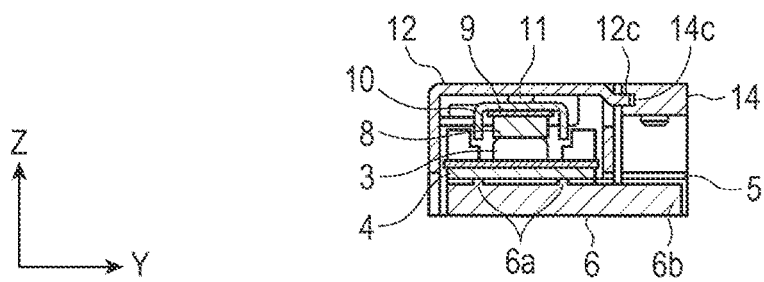
FIG. 2D is a view for illustrating the example of the vibration wave motor according to the first embodiment.

As a first embodiment of the present disclosure, an example in which the present disclosure is applied to a linear-type vibration wave driving apparatus will be described. The linear-type vibration wave driving apparatus according to the first embodiment will be described below with reference to FIG. 1 to FIG. 8. First, a vibration wave motor of the linear-type vibration wave driving apparatus will be described in detail with reference to FIG. 1 to FIG. 2D. FIG. 1 is an exploded perspective view of the vibration wave motor 1 according to the first embodiment. FIG. 2A to FIG. 2D are assembly views of the vibration wave motor 1. Specifically, FIG. 2A is a perspective view of the vibration wave motor 1, and FIG. 2B is an XZ plane view of the vibration wave motor 1. FIG. 2C is an XZ sectional view of the vibration wave motor 1 according to the line 2C-2C in FIG. 2A, and FIG. 2D is a YZ sectional view of the vibration wave motor 1 according to the line 2D-2D in FIG. 2C. Here, a relative-moving direction of a vibrator 2 is defined as an X direction, a pressurizing direction as a Z direction, and a direction orthogonal to the X direction and the Z direction as the Y direction. In the present disclosure, an upper direction and a lower direction correspond to an upper direction and a lower direction in the Z direction, respectively.

The vibration wave motor 1 includes an elastic member 3, a piezoelectric element 4, a flexible print circuit board 5, a retaining member 6, pressurizing springs 7, a friction member 8, a rubber 9, a first guiding member 10, a second guiding member 12, screws 13, and a base 14. The elastic member 3 includes a body portion 3c having a rectangular shape and a plurality of extending portions 3b (in this case, 2 positions×2=4) extending from a plurality of respective positions (in this case, 2 positions) in the body portion 3c in the X direction. The plurality of the extending portions 3b extend from a plurality of positions (in this case, 4 positions) in the body portion 3c, which are different from each other in the X direction and the Y direction.

The piezoelectric element 4 which is an electric-mechanical energy conversion element is fixed to the elastic member 3 by an adhesive or the like. The flexible print circuit board 5 is fixed on a surface opposite to a surface of the piezoelectric element 4 to which the elastic member 3 is fixed. The elastic member 3, the piezoelectric element 4 and the flexible print circuit board 5 configure the vibrator 2. The fixing method of the piezoelectric element 4 and the flexible print circuit board 5 may be carried out by using an anisotropic electroconductive paste or an anisotropic electroconductive film that enables electric conduction only in the Z direction.

As a material of the elastic member 3, a material having small attenuation of vibration, such as metal or a ceramic, can be used. In the production of the elastic member 3, the protruding portions 3a may be integrally formed by press molding or cutting, or separately produced and fixed to the elastic member 3 later by welding or adhesion. Further, a plurality of the protruding portions 3a may be provided as in the first embodiment, and only one protruding portion 3a may be provided.

The piezoelectric element 4 may be configured using lead zirconate titanate. The piezoelectric element 4 may be made of a piezoelectric material containing no lead, such as barium titanate or sodium bismuth titanate as a main component. Electrode patterns (not shown) are formed on the both surfaces of the piezoelectric element 4, and the power is supplied from the flexible print circuit board 5 by using the electrode patterns.

A pressurizing mechanism according to the first embodiment will now be described. The retaining member 6 pressurizing and retaining the vibrator 2 is provided below the vibrator 2. The second guiding member 12 is provided above the vibrator 2. Two pressurizing fulcrums 6e provided at one end of the retaining member 6 in the X direction and two fitting portions 12b provided at the second guiding member 12 are rotatably fitted around the Y axis direction. The pressurizing springs 7 are provided between the second guiding member 12 and spring locating portions 6f provided at the other end of the retaining member 6 in the X direction. As the pressurizing spring 7, for example, an extension coil spring can be used. Two convex portions 6a are provided on the retaining member 6 at a substantially central position in the X direction between the pressurizing fulcrum 6e and the pressurizing spring 7, and the two convex portions 6a are in contact with the vibrator 2.

As described above, in the pressurizing mechanism according to the first embodiment, a pressurizing force is applied to the vibrator 2 in the Z direction by the principle of leverage in a case where the pressurizing fulcrums 6e are used as the fulcrums, the spring locating portions 6f are used as the points of effort, and the convex portions 6a are used as the points of load. The friction member 8 (hereinafter also referred to as "contacting member") is provided above the vibrator 2, and is in pressurizing contact with the protruding portions 3a of the elastic member 3 in the Z direction by the pressurizing force applied to the vibrator 2 by the pressurizing mechanism. The pressurizing mechanism allows the vibrator 2, the retaining member 6, and the second guiding member 12 to move integrally in the X direction.

As shown in FIG. 2C, an outputting member 6d is provided on a surface of the retaining member 6 opposite to a surface of the retaining member 6 on which the convex portions 6a are provided. The vibration wave motor 1 can output a driving force generated by the movement of the vibrator 2 to the outside by the outputting member 6d of the retaining member 6. In the first embodiment, the pressurizing fulcrums 6e are provided at the one end of the retaining member 6 in the X direction, and the spring locating portions 6f are provided at the other end. However, the configuration of the pressurizing fulcrum 6e and the spring locating portion 6f is not limited to the configuration in which the pressurizing fulcrum 6e and the spring locating portion 6f are provided at the ends of the retaining member 6 in the X direction. Each of the pressurizing fulcrum 6e and the spring locating portion 6f may be provided at positions at which the pressurizing fulcrum 6e and the spring locating portion 6f can function as the fulcrum and the point of effort of the principle of leverage using the convex portions 6a as the points of load, respectively. The flexible print circuit board 5 can be fixed to a flexible print circuit board holder 6b of the retaining member 6 by a double-side tape or the like.

The rubber 9, the first guiding member 10, and the second guiding member 12 are provided above the contacting member 8. The contacting member 8 is fixed to the first guiding member 10 by the adsorption force of the rubber 9. The rubber 9 also serves a function of vibration damping which makes it difficult to transmit vibration from the vibrator 2 to the first guiding member 10. The first guiding member 10 is fixed to the base 14 which is a fixing member by the screws 13. The fixing method of the contacting member 8, and the first guiding member 10 and the rubber 9 may be adhesive or screw fastening. The contacting member 8 may be made of a metal, ceramic, resin or a composite material thereof having high wear resistance. Particularly, a material obtained by nitriding stainless steel such as SUS420J2 can be used as the material of the contacting member 8 from the viewpoint of wear resistance and mass productivity.

Next, a linear guiding mechanism according to the first embodiment will be described. Each of the first guiding member 10 and the second guiding member 12 includes two rolling grooves 10a, 12a, and the two balls 11 are sandwiched between the two rolling grooves 10a and the two rolling grooves 12a. Thus, when the vibration wave motor 1 drives, the balls 11 roll in the rolling grooves 10a, 12a, so that the vibrator 2, the retaining member 6 and the second guiding member 12 can move smoothly in the X direction. For the materials of the first guiding member 10 and the second guiding member 12, hardness is required because they are pressurized at the respective rolling grooves 10a and 12a. In addition to this, from the viewpoint of processability, a metal, particularly stainless steel, can be used for the materials of the first guiding member 10 and the second guiding member 12.

The base 14 includes two fixing portions 14a in which screw holes for fixing the first guiding member 10, a retainer, and holes for fixing the base 14 to the outside are provided, a connecting portion 14b for connecting the two fixing portions 14a, a groove portion 14c, and collision preventing portions 14d. The groove portion 14c is formed along the X direction in a part of the connecting portion 14b. By loosely fitting, that is fitting in a state of having a predetermined play, the groove portion 14c and a tilt restricting portion 12c provided in the second guiding member 12, the rotation around the X-axis of the vibrator 2 and the like can be restricted. The collision preventing portions 14d extend from the fixing portions 14a toward the retaining member 6 side in the X direction, and can prevent the pressurizing fulcrums 6e and the spring locating portions 6f of the retaining member 6 from colliding with the fixing portions 14a as the retaining member 6 moves. The base 14 may be formed of a resin from the viewpoint of processability and slidability.

The flexible print circuit board 5 is fixed to the connecting portion 14b. Therefore, the base 14 also serves a function of accommodating a curved portion of the flexible print circuit board 5, which moves while curving according to the movement of the vibrator 2 and the retaining member 6.

Figure 3A:
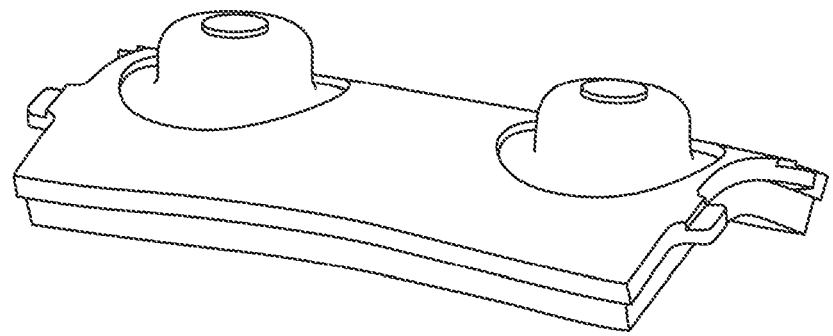
FIG. 3A is a view for explaining an example of a vibration mode according to the first embodiment.
Figure 3B:
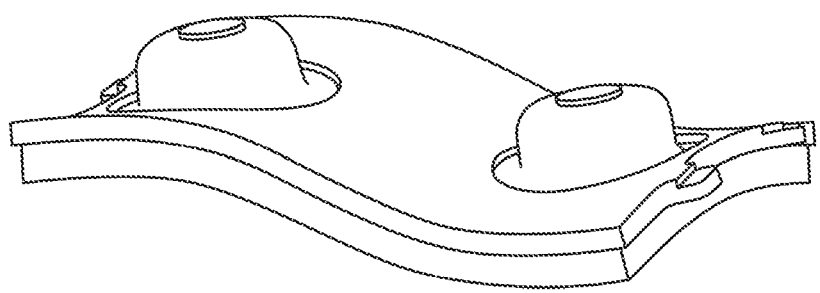
FIG. 3B is a view for explaining an example of the vibration mode according to the first embodiment.

Next, a vibration mode excited by the vibrator 2 will be described with reference to FIG. 3A and FIG. 3B. In the first embodiment, an alternating voltage is applied to the piezoelectric element 4 through the flexible print circuit board 5 to excite standing waves different in phase from each other (out-of-plane bending vibration) by the vibrator 2, thereby generating vibrations synthesized from these out-of-plane bending vibration. FIG. 3A shows the vibrator 2 driven in a mode A, which is a first vibration mode, and FIG. 3B shows the vibrator 2 driven in mode B, which is a second vibration mode. In FIG. 3A and FIG. 3B, the flexible print circuit board 5 is omitted to show the vibrator 2 for simplification of the description.

The mode A, which is the first vibration mode, is a primary out-of-plane bending vibration mode in which two nodes appear parallel to the X direction which is the longitudinal direction of the vibrator 2. The vibration of the mode A displaces the two protruding portions 3a in the Z direction which is the pressurizing direction. The mode B, which is the second vibration mode, is a secondary out-of-plane bending vibration mode in which three nodes substantially parallel to the Y direction, which is the shorter direction of the vibrator 2, appear. The vibration of the mode B displaces the two protruding portions 3a in the X direction.

By synthesizing the vibrations of the modes A and B, the two protruding portions 3a moves elliptically or circularly in the XZ plane. When the contacting member 8 is brought into pressurizing contact with the protruding portions 3a, a frictional force is generated in the X direction, and a driving force (thrust) for relatively moving the vibrator 2 and the contacting member 8 is generated. In the first embodiment, since the contacting member 8 is fixed to the base 14 as described above, the vibrator 2 moves in the X direction.

In order to efficiently drive the vibration wave motor 1, it is necessary to support the vibrator 2 without inhibiting the vibration (displacement) of the two vibration modes excited by the vibrator 2. For this purpose, it is desirable to support the vibrator 2 in the vicinity of the nodes of these two vibration modes. For this reason, the two convex portions 6a are provided on the retaining member 6 in order to pressurize and retain the common nodes of the two vibration modes excited by the vibrator 2. Further, by positioning the vibrator 2 by using retainers 6c provided in the retaining member 6, the two convex portions 6a can be brought into contact with the vibrator 2 in the vicinity of the nodes in the two vibration modes.

Furthermore, the convex portions 6a not only pressurize the vibrator 2 but also retain the vibrator 2 in the X and Y directions by the frictional force. In the first embodiment, since the maximum value of the static friction force between the convex portions 6a and vibrator 2 is always larger than the reaction force received by the vibrator 2 from the contacting member 8 when the vibrator 2 is driven, the vibrator 2 does not move with respect to the retaining member 6. Thus, precise driving can be performed.

Figure 4:
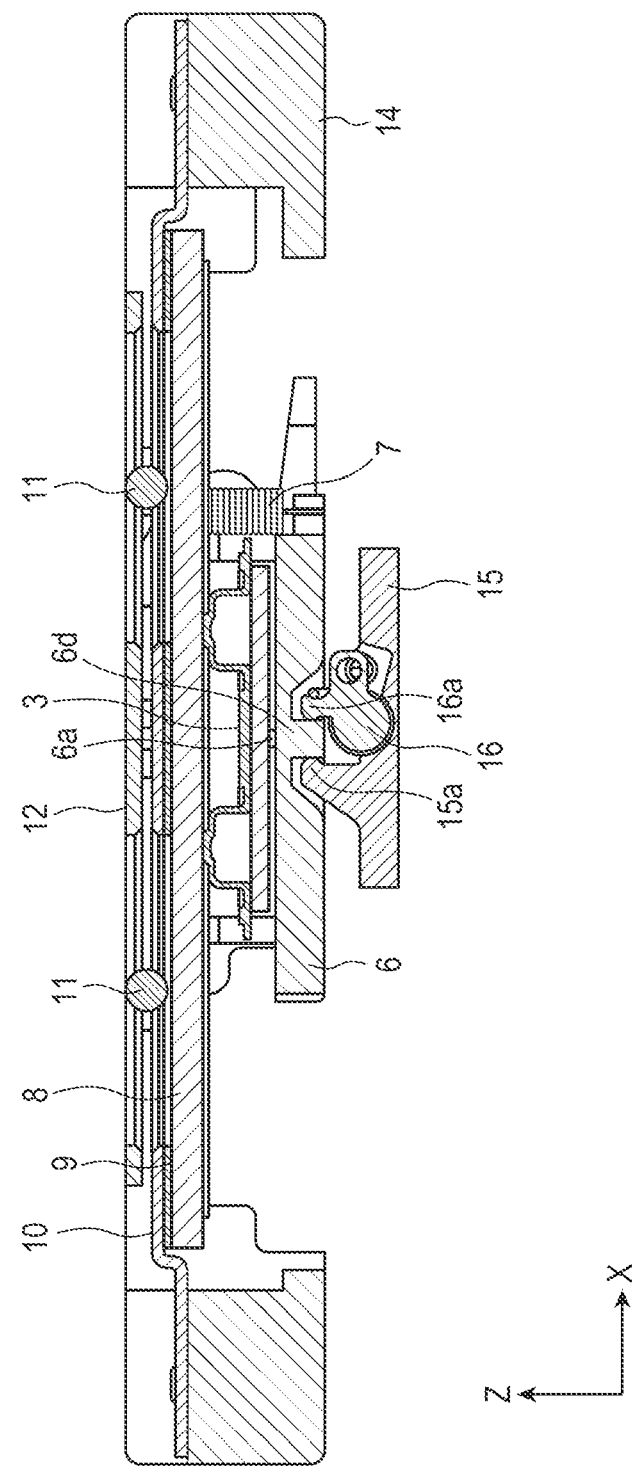
FIG. 4 is an XZ sectional view of the example of the vibration wave motor and an example of an output transmission member according to the first embodiment.
Figure 5A:
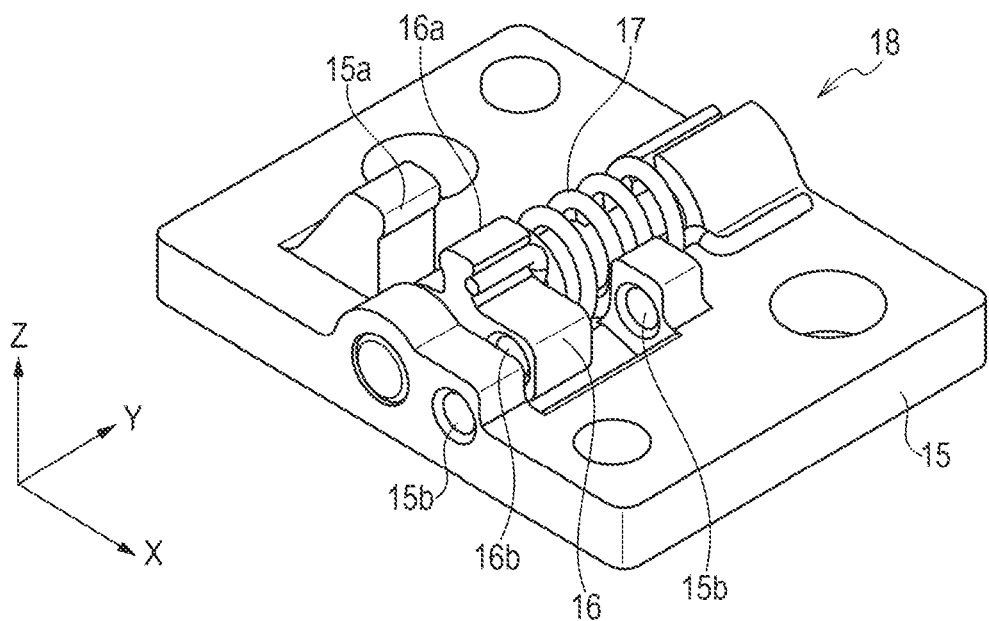
FIG. 5A is a view for illustrating the example of the output transmission member of a vibration wave driving apparatus according to the first embodiment.
Figure 5B:
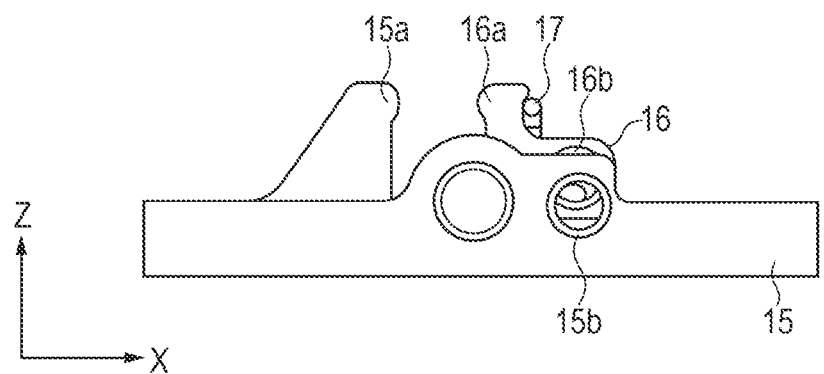
FIG. 5B is a view for illustrating the example of the output transmission member of the vibration wave driving apparatus according to the first embodiment.

Next, an output transmission mechanism according to the first embodiment will be described with reference to FIG. 4 to FIG. 5B. FIG. 4 is an XZ sectional view of the vibration wave motor 1 and the output transmission member 18 according to the first embodiment. FIG. 5A is a perspective view of the output transmission member 18. FIG. 5B is an XZ plane view of the output transmission member 18.

The output transmission member 18 according to the first embodiment includes a first holding member 15, a second holding member 16, and a torsion spring 17. A first holding portion 15a of the first holding member 15 and a second holding portion 16a of the second holding member 16 sandwich the outputting member 6d. The second holding member 16 is rotatably fitted around the Y-axis to the first holding member 15, and given a holding force around the Y-axis while being pressed to remove a gap in the Y-axis direction with a predetermined force by the torsion spring 17.

Since the holding force is larger than the thrust force generated by the vibration wave motor 1, precise driving of a driven member can be performed without generating a gap between the vibration wave motor 1 and the driven member connected to the output transmission member 18. Further, since the outputting member 6d is held in the X direction which is the moving direction of the vibrator 2, stable driving can be performed without affecting the pressurizing force applied to the vibrator 2.

Figure 6A:
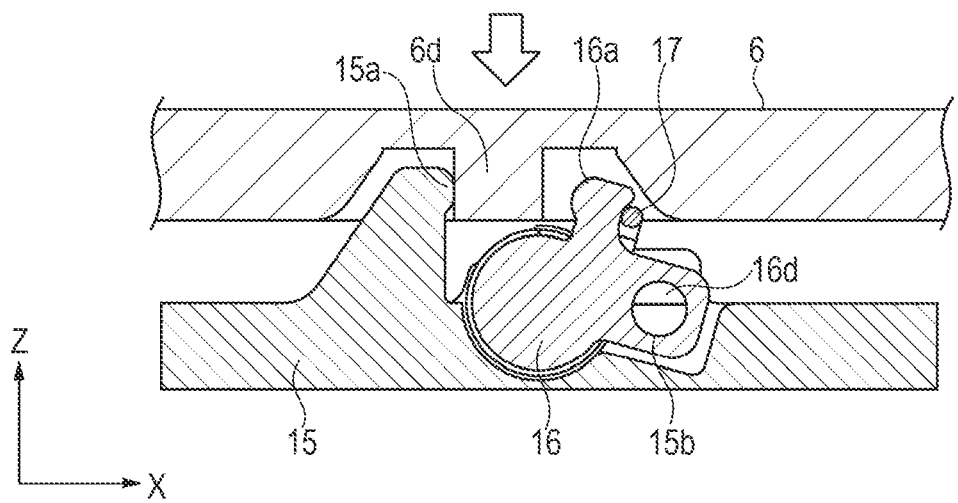
FIG. 6A is a view for illustrating an example of a temporary fixed state of the output transmission member of the vibration wave driving apparatus according to the first embodiment.
Figure 6B:
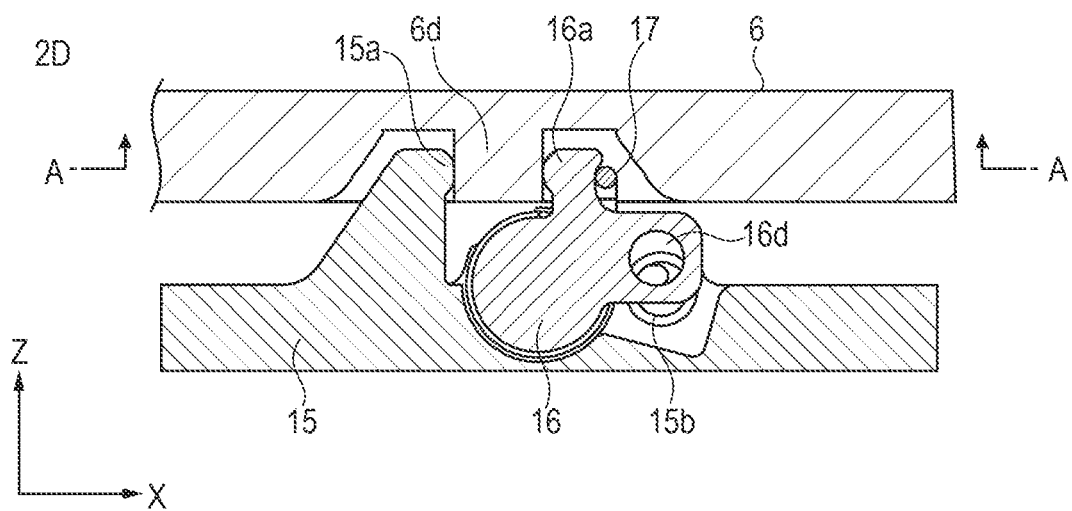
FIG. 6B is a view for illustrating an example of an assembled state of the output transmission member of the vibration wave driving apparatus according to the first embodiment.
Figure 7:
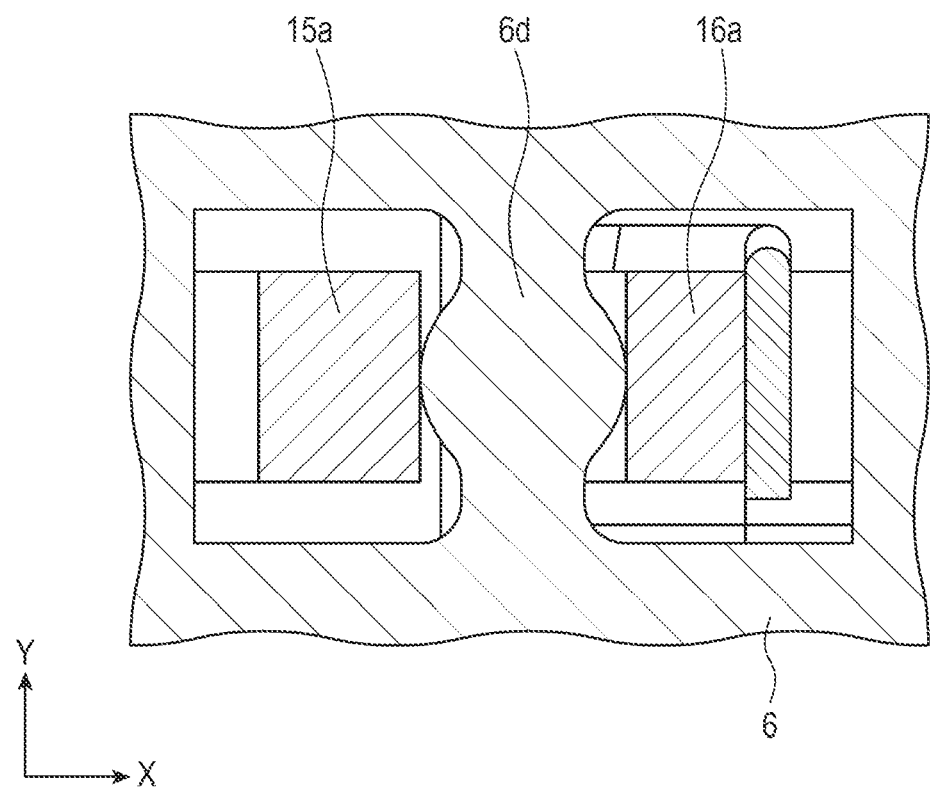
FIG. 7 is an XY sectional view for illustrating the example of the output transmission member of the vibration wave driving apparatus according to the first embodiment.

Next, with reference to FIG. 6A to FIG. 7, a configuration at the time of assembling will be described. FIG. 6A is an XZ sectional view of a temporary fixed state of the output transmission member 18 of the vibration wave driving apparatus. FIG. 6B is an XZ sectional view of an assembled state of the output transmission member 18 of the vibration wave driving apparatus. FIG. 7 is an XY sectional view of the output transmission member 18 of the vibration wave driving apparatus according to the line A-A in FIG. 6B.

The first holding member 15 includes two first temporary fixing holes 15b, and the second holding member 16 includes a second temporary fixing hole 16b. The first temporary fixing holes 15b and the second temporary fixing hole 16b are arranged substantially coaxially, and a temporary fixing pin (not shown) is inserted into the first temporary fixing holes 15b and the second temporary fixing hole 16b. As a result, it is possible to maintain a state in which a gap between the two holding portions is wider than the width of the outputting member 6d, that is, a temporary fixed state in which no holding force is applied. In this state, the outputting member 6d of the vibration wave motor 1 is disposed between the first holding portion 15a and the second holding portion 16a as shown in FIG. 6A, and the fixing portion 14a is screwed to fix the vibration wave motor 1 to another member. Subsequently, the temporary fixing is released by pulling out the temporary fixing pin (not shown). As a result, as shown in FIG. 6B, the holding force is applied to the outputting member 6d by the first holding portion 15a and the second holding portion 16a. The output transmission mechanism according to the first embodiment can also be efficiently assembled by using the temporary fixing.

Next, a contact shape with the outputting member 6d in each holding member will be described. As shown in FIG. 6B, in the XZ cross section, the contact surfaces of the first holding portion 15a and the second holding portion 16a with the outputting member 6d are curved surfaces. As a result, even if an assembly error about the Y-axis occurs between the vibration wave motor 1 and each holding member, it is possible to reduce unnecessary force applied to the retaining member 6. On the other hand, as shown in FIG. 7, in the XY cross section of the portion where the outputting member 6d is held, the outputting member 6d has a curved contact portion, and the first holding portion 15a and the second holding portion 16a have straight contact portions. As a result, even if an assembly error about the Z axis occurs between the vibration wave motor 1 and each holding member, it is possible to reduce unnecessary force applied to the retaining member 6.

Figure 8:
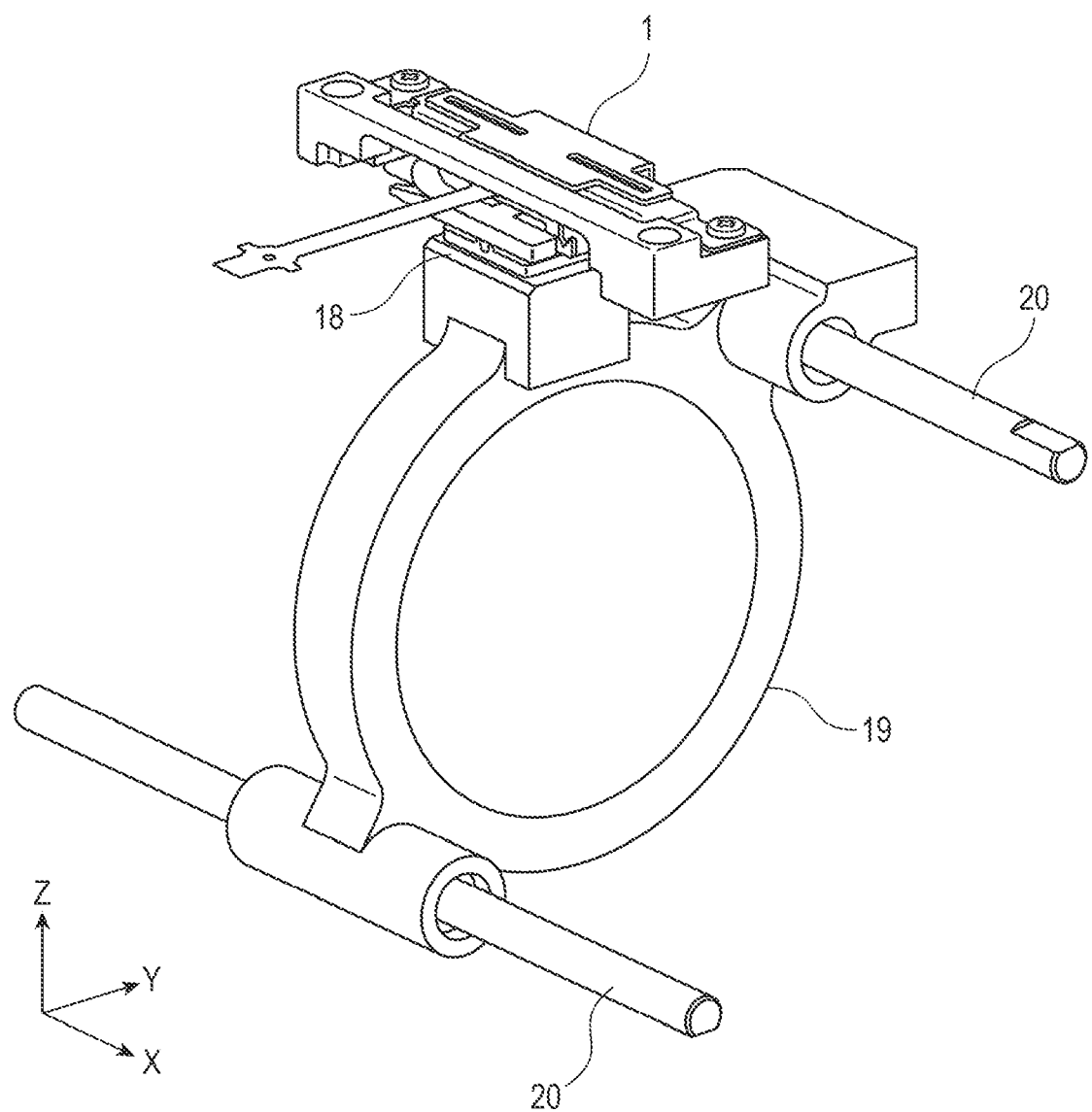
FIG. 8 is a view for illustrating an example of a lens component incorporating the vibration wave driving apparatus according to the first embodiment.

Finally, a method of driving the driven member 19 by the vibration wave motor 1 and the output transmission member 18 according to the first embodiment will be described with reference to FIG. 8. FIG. 8 shows an example of a lens component incorporating the vibration wave driving apparatus. Here, as an example of the driven member 19, an example of using a lens ring which receives movement axes 20 and is movable along the movement axes 20 will be described. The output transmission member 18 is fixed to a part of the driven member 19 by a screw or the like. On the other hand, the vibration wave motor 1 is fixed to a fixing base (not shown) by a screw. In this case, the outputting member 6d of the vibration wave motor 1 and the output transmission member 18 are combined by the method described with reference to FIG. 6A and FIG. 6B.

When the vibration wave motor 1 is driven, the driving unit (the vibrator 2, the retaining member 6, the second guiding member 12, and the pressurizing spring 7) of the vibration wave motor 1, the output transmission member 18, and the driven member 19 integrally move in the X direction. At this time, even if an error occurs in the parallelism between the movement axes 20 of the driven member 19 and the drive unit of the vibration wave motor 1, since the outputting member 6d and the first and second holding members 15a, 16a are restrained only in the X-axis direction, only a frictional force acts in the Z-axis and Y-axis directions. Therefore, the variation of the pressurizing force acting on the vibrator 2 can be minimized. From this viewpoint, a material having a low coefficient of friction can be selected as the materials of the outputting member 6d, the first holding portion 15a and the second holding portion 16a. For example, it is also effective to apply a lubricant, such as grease, to them.

As described above, the vibration wave driving apparatus according to the first embodiment includes the vibration wave motor 1 functioning as an example of a vibration actuator and the driven member 19 driven by the vibration wave motor 1. The vibration wave motor 1 includes the vibrator 2 having the piezoelectric element 4 and the elastic member 3 to which the piezoelectric element 4 is fixed, and a pressurizing member pressurizing the vibrator 2. Here, the piezoelectric element 4 functions as an example of an electric-mechanical energy conversion element that converts electric energy into mechanical energy. The vibration wave motor 1 also includes the contacting member 8 which pressurizing-contacts with the vibrator 2 by pressurizing the vibrator 2 by the pressurizing member and moves relative to the vibrator 2. Further, the vibration wave motor 1 includes the outputting member 6d outputting the driving force to the driven member 19, the driving force generated by the relative-moving of the contacting member 8 to the vibrator 2. The driven member 19 includes the output transmission member 18 holding the outputting member 6d in the direction of the relative-moving with a predetermined spring force.

As described above, the vibration wave driving apparatus according to the first embodiment employs the output transmission member which holds a part of the retaining member of the linear-type vibration wave motor in the X direction, which is the relative-moving direction, with the predetermined spring force. As a result, it is possible to provide a vibration wave driving apparatus which is small in size and can suppress a decrease in the output transmitted to the outside.

Further, the output transmission member 18 includes the first holding member 15, the second holding member 16 different from the first holding member 15, and a torsion spring 17 functioning as an example of a holding force applying member pressing the second holding member 16. The output transmission member 18 holds the outputting member 6d by the first holding member 15 and the second holding member 16. On the other hand, when the first temporary fixing hole 15b provided in the first holding member 15 and the second temporary fixing hole 16b provided in the second holding member 16 are arranged substantially coaxially, the output transmission member 18 does not hold the outputting member 6d. Therefore, when the apparatus is assembled, the apparatus can be efficiently assembled by arranging the first temporary fixing hole 15b and the second temporary fixing hole 16b substantially coaxially so that the output transmission member 18 comes into a temporary fixed state.

The contacting portions of the first holding member 15 and the second holding member 16 with respect to the outputting member 6d have curved shapes when viewed in the cross section including the relative-moving direction and the pressurizing direction. As a result, even if an assembly error about the Y-axis occurs between the vibration wave motor 1 and each holding member, it is possible to reduce unnecessary force applied to the retaining member 6. The contacting portions of the first holding member 15 and the second holding member 16 with respect to outputting member 6d have linear shapes when viewed in the cross section including the relative-moving direction and the direction perpendicular to the relative-moving direction and the pressing direction, and the outputting member 6d has a curved shape. Thus, even if an assembly error about the Z-axis occurs between the vibration wave motor 1 and each holding member, it is possible to reduce the unnecessary force applied to the retaining member 6.

The pressurizing member also includes the retaining member 6 retaining the vibrator 2, the second guiding member 12 functioning as an example of a guiding member guiding the relative-moving between the vibrator 2 and the contacting member 8, and an energizing member energizing the retaining member 6 and the second guiding member 12 to each other. Here, the pressurizing spring 7 functions as an example of the energizing member. The vibrator 2 and the contacting member 8 are arranged between the retaining member 6 and the second guiding member 12. The pressurizing member pressurizes the vibrator 2 by energizing the retaining member 6 and the second guiding member 12 to each other by the pressurizing spring 7. Thus, the pressurizing member can guide the relative-moving between the vibrator 2 and the contacting member 8 by the second guiding member 12 while pressurizing the vibrator 2.

In the linear type vibration wave motor 1 according to the present disclosure, the method of generating an elliptical motion or a circular motion on the contact surface is not limited to the above-described method. For example, vibrations of bending vibration modes different from the above-mentioned bending vibration modes may be combined with each other, or vibration of a longitudinal vibration mode for elongating and contracting the elastic member 3 in the longitudinal direction may be combined with vibration of a bending vibration mode. Any drive method may be used, as long as there is a common node for pressurizing and retaining, and elliptical and circular motions are generated on the contact surface by a combination of a vibration mode for moving the contact surface in the moving direction of the contacting member 8 and a vibration mode for moving the contact surface in the pressurizing direction.

Second Embodiment

Figure 9A:
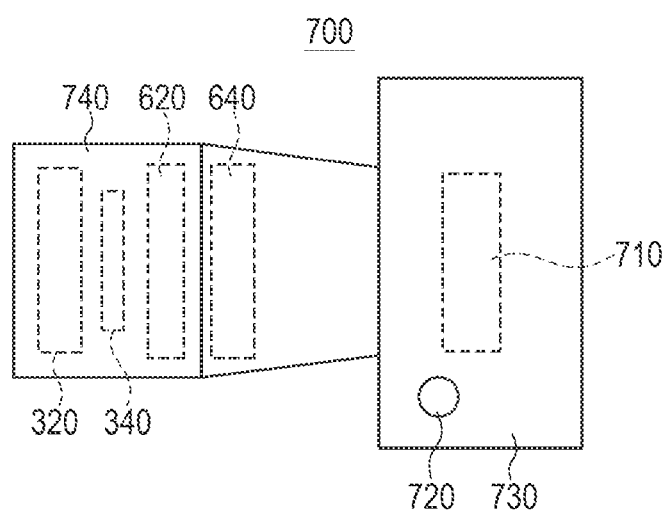
FIG. 9A is a view for illustrating an example of an image pickup apparatus using a vibration wave driving apparatus according to a second embodiment.
Figure 9B:
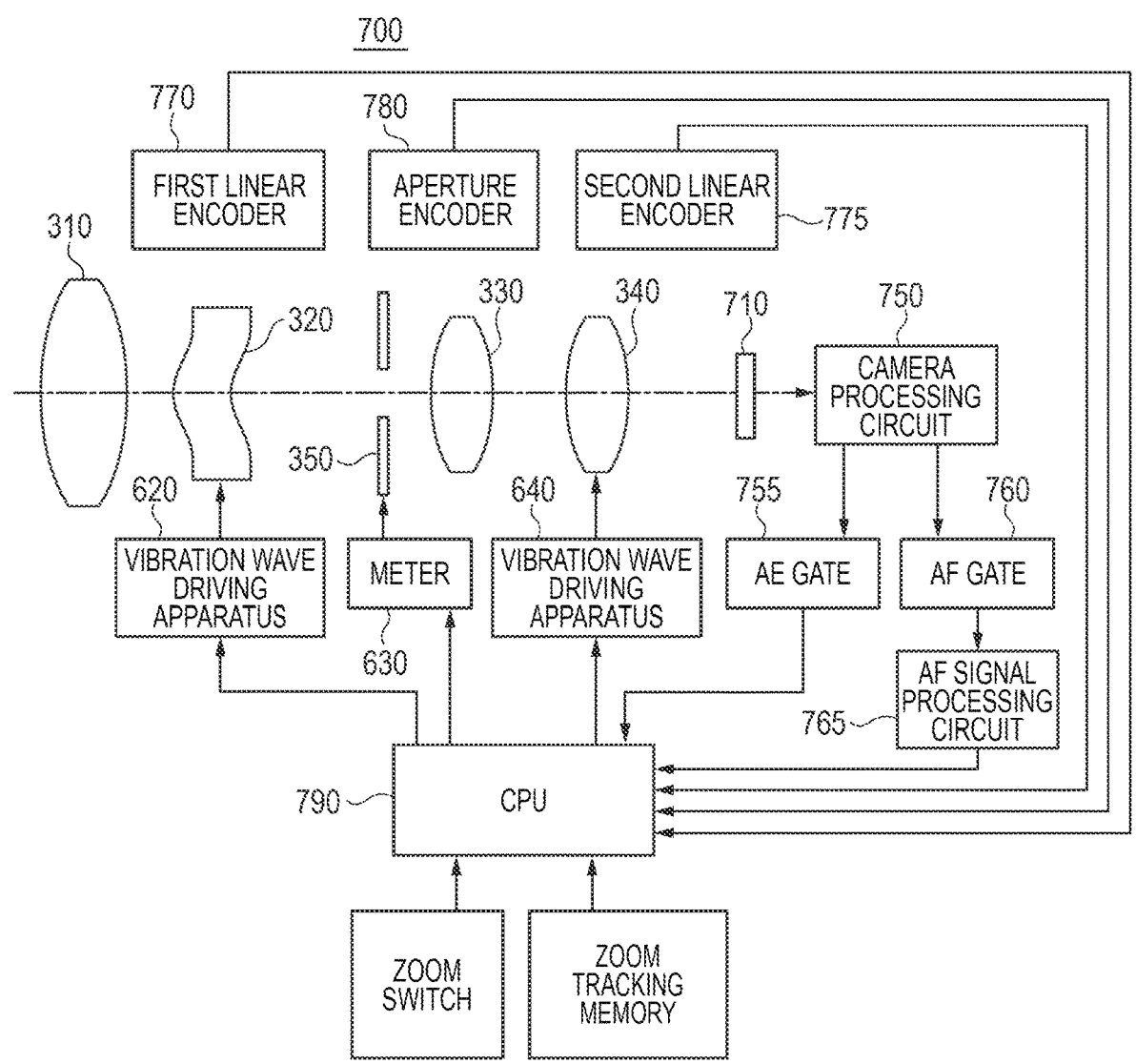
FIG. 9B is a view for illustrating the example of the image pickup apparatus using the vibration wave driving apparatus according to the second embodiment.

A vibration wave driving apparatus can be used, for example, in a lens-driving application of an image pickup apparatus (an optical device, or an electronic device). With reference to FIG. 9A and FIG. 9B, an example of an image pickup apparatus in which a vibration wave driving apparatus is used to drive a lens arranged in a lens barrel will be described as a second embodiment of the present disclosure.

FIG. 9A is a top view showing a schematic configuration of an image pickup apparatus 700. The image pickup apparatus 700 includes a camera body 730 mounted with an image pickup device 710 and a power button 720. The image pickup apparatus 700 includes a lens barrel 740 having a first lens group (not shown), a second lens group 320, a third lens group (not shown), a fourth lens group 340, and vibration wave driving apparatuses 620, 640. The lens barrel 740 is replaceable as an interchangeable lens, and a lens barrel 740 suitable for a photographing object can be attached to the camera body 730. In the image pickup apparatus 700, the second lens group 320 and the fourth lens group 340 are driven by the two vibration wave driving apparatuses 620 and 640, respectively.

The vibration wave driving apparatus 620 has the same structure as that of the vibration wave driving apparatus according to the first embodiment. In the vibration wave driving apparatus 620, the driving portion of the vibration wave motor 1 and the output transmission member 18 are integrated with the second lens group 320 to move the second lens group 320 in the optical axis direction. The vibration wave driving apparatus 640 moves the fourth lens group 340 in the optical axis direction by having the same configuration as the vibration wave driving apparatus 620.

FIG. 9B is a block diagram showing a schematic configuration of the image pickup apparatus 700. Inside the lens barrel 740, the first lens group 310, the second lens group 320, the third lens group 330, the fourth lens group 340 and a light quantity adjusting unit 350 are arranged at predetermined positions on the optical axis. The light passing through the first lens group 310 to the fourth lens group 340 and the light quantity adjusting unit 350 forms an image on the image pickup device 710. The image pickup device 710 converts the optical image into an electrical signal and outputs the electrical signal to the camera processing circuit 750.

The camera processing circuit 750 applies amplification, gamma correction, and the like to the output signal from the image pickup device 710. The camera processing circuit 750 is connected to a CPU 790 via an AE gate 755 and to the CPU 790 via an AF gate 760 and an AF signal processing circuit 765. A video signal subjected to the predetermined processing in the camera processing circuit 750 is sent to the CPU 790 through the AE gate 755, and through the AF gate 760 and the AF signal processing circuit 765. The AF signal processing circuit 765 extracts a high-frequency component of the video signal, generates an evaluation value signal for autofocus (AF), and supplies the generated evaluation value to the CPU 790.

The CPU 790 is a control circuit for controlling the overall operation of the image pickup apparatus 700, and generates a control signal for determining exposure and focusing from the acquired video signals. The CPU 790 adjusts positions of the second lens group 320, the fourth lens group 340, and the light intensity adjustment unit 350 in the optical axis direction by controlling the drive of the vibration wave driving apparatuses 620, 640, and the meter 630 so that the determined exposure and an appropriate focus state are obtained. Under the control of the CPU 790, the vibration wave driving apparatus 620 moves the second lens group 320 in the optical axis direction, the vibration wave driving apparatus 640 moves the fourth lens group 340 in the optical axis direction, and the meter 630 controls the driving of the light quantity adjusting unit 350.

The position of the second lens group 320 driven by the vibration wave driving apparatus 620 in the optical axis direction is detected by a first linear encoder 770, and the detection result is notified to the CPU 790, thereby being fed back to the driving of the vibration wave driving apparatus 620. Similarly, the position of the fourth lens group 340 driven by the vibration wave driving apparatus 640 in the optical axis direction is detected by a second linear encoder 775, and the detection result is notified to the CPU 790, thereby being fed back to the driving of the vibration wave driving apparatus 640. The position of the light quantity adjusting unit 350 in the optical axis direction is detected by an aperture encoder 780, and the detection result is notified to the CPU 790, thereby being fed back to the driving of the meter 630.

As described above, the image pickup apparatus 700 according to the second embodiment includes the vibration wave driving apparatuses 620, 640 having the same configuration as that of the vibration wave driving apparatus according to the first embodiment, the image pickup device 710, and the CPU 790 functioning as an example of a controller controlling the piezoelectric elements 4 of the vibration wave driving apparatuses 620, 640. The image pickup apparatus 700 also includes the second lens group 320 and the fourth lens group 340 as the driven members.

With such a configuration, the image pickup apparatus 700 can perform autofocus by using the vibration wave driving apparatuses 620, 640. Further, by using the vibration wave driving apparatuses 620, 640, the design restriction of the image pickup apparatus 700 can be relaxed, and miniaturization can be easily carried out.

According to the above-described embodiments of the present disclosure, it is possible to provide a vibration wave driving apparatus which is small in size and can suppress degradation of an output transmitted to the outside.

The above-described embodiments and modifications may be suitably combined without departing from the spirit of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-124537, filed Jul. 29, 2021, which is hereby incorporated by reference herein in its entirety.

What is claimed is:

1. A vibration wave driving apparatus comprising:
a vibration actuator; and
a driven member configured to be driven by the vibration actuator,
wherein the vibration actuator includes:
  a vibrator having an electric-mechanical energy conversion element and an elastic member to which the electric-mechanical energy conversion element is fixed;
  a pressing member configured to press the vibrator;
  a contact member configured to press-contact the vibrator by pressing the vibrator using the pressing member and move relative to the vibrator; and
  an outputting member configured to output a driving force to the driven member, the driving force generated by the moving of the contact member relative to the vibrator, and
wherein the driven member includes an output transmission member configured to hold the outputting member in a direction of the relative movement with a predetermined spring force.

2. The vibration wave driving apparatus according to claim 1,
wherein the output transmission member includes a first holding member, a second holding member different from the first holding member, and a holding force applying member configured to press the second holding member, and
wherein the output transmission member is configured to hold the outputting member by the first holding member and the second holding member.

3. The vibration wave driving apparatus according to claim 2, wherein when a first temporary fixing hole provided in the first holding member and a second temporary fixing hole provided in the second holding member are disposed substantially coaxially, the output transmission member does not hold the outputting member.

4. The vibration wave driving apparatus according to claim 2, wherein contacting portions of the first holding member and the second holding member with the outputting member have curved shapes when viewed in a cross-section including the direction of the relative movement and a direction of the pressing.

5. The vibration wave driving apparatus according to claim 2, wherein contacting portions of the first holding member and the second holding member with the outputting member have linear shapes when viewed in a cross-section including the direction of the relative movement and a direction orthogonal to a direction of the pressing and the direction of the relative movement.

6. The vibration wave driving apparatus according to claim 1,
wherein the pressing member includes:
  a retaining member configured to retain the vibrator;
  a guiding member configured to guide the relative movement between the vibrator and the contact member; and
  a force applying member configured to urge the retaining member and the guiding member toward each other,
wherein the vibrator and the contact member are disposed between the retaining member and the guiding member, and wherein the pressing member is configured to press the vibrator by urging the retaining member and the guiding member toward each other by the force applying member.

7. An image pickup apparatus comprising:
the vibration wave driving apparatus according to claim 1; and
an image pickup device driven by the driven member.

8. An optical device comprising:
the vibration wave driving apparatus according to claim 1; and
an optical element driven by the driven member.

9. An electronic device comprising:
the vibration wave driving apparatus according to claim 1; and
an object driven by the driven member.

* * * * *